(12) United States Patent
Yang

(10) Patent No.: US 6,278,260 B1
(45) Date of Patent: Aug. 21, 2001

(54) CHARGING DEVICE WHICH MONITORS CHARGING BY DETECTING A TEMPERATURE OF THE BATTERY AND WHICH INCLUDES COMPENSATION FOR INCREASES OR DECREASES IN AMBIENT TEMPERATURE

(76) Inventor: Tai-Her Yang, No. 59, Chung Hsing 8 St., Si-Hu Town, Dzari-Hua (TW)

( * ) Notice: Subject to any disclaimer, the term of this patent is extended or adjusted under 35 U.S.C. 154(b) by 0 days.

(21) Appl. No.: 09/456,512

(22) Filed: Dec. 8, 1999

(51) Int. Cl.$^7$ ........................................... H02J 7/04
(52) U.S. Cl. ................................................. 320/150
(58) Field of Search ............................................ 320/150

(56) References Cited

U.S. PATENT DOCUMENTS

| | | | |
|---|---|---|---|
| 3,654,426 | * | 4/1972 | Brinmann et al. ............... 219/209 |
| 4,755,735 | * | 7/1988 | Inakagata ........................ 320/150 |
| 5,610,499 | * | 3/1997 | Rogers ............................ 320/137 |
| 5,640,079 | * | 6/1997 | Nelson et al. .................... 320/153 |
| 5,739,673 | * | 4/1998 | Le Van Suu ..................... 320/150 |
| 5,744,936 | * | 4/1998 | Kawakami ....................... 320/120 |
| 5,828,203 | * | 10/1998 | Lindeboom et al. ............. 320/150 |
| 5,872,443 | * | 2/1999 | Williamson ..................... 320/160 |
| 5,912,547 | * | 6/1999 | Grabon ............................ 320/150 |
| 6,075,378 | * | 6/2000 | Okamura ......................... 324/771 |
| 6,081,101 | * | 6/2000 | Yang ............................... 320/154 |

* cited by examiner

Primary Examiner—Peter S. Wong
Assistant Examiner—Pia Tibbits
(74) Attorney, Agent, or Firm—Bacon & Thomas, PLLC

(57) ABSTRACT

A charging device monitors charging by detecting temperature, and includes environmental temperature differential compensation capabilities so that a charging control circuit is simultaneously supplied with the output of an ambient temperature detector, on the one hand, and the output of a detector of the temperature of a rechargeable cell in a state of being charged, on the other hand, so that when the ambient temperature decreases, the battery temperature threshold or testing point for determining a charge saturation status of the rechargeable cell is reduced accordingly, while when the ambient temperature increases, the corresponding battery temperature threshold or testing point will be increased correspondingly, thereby increasing the precision and reliability of the charge saturation test results.

13 Claims, 3 Drawing Sheets

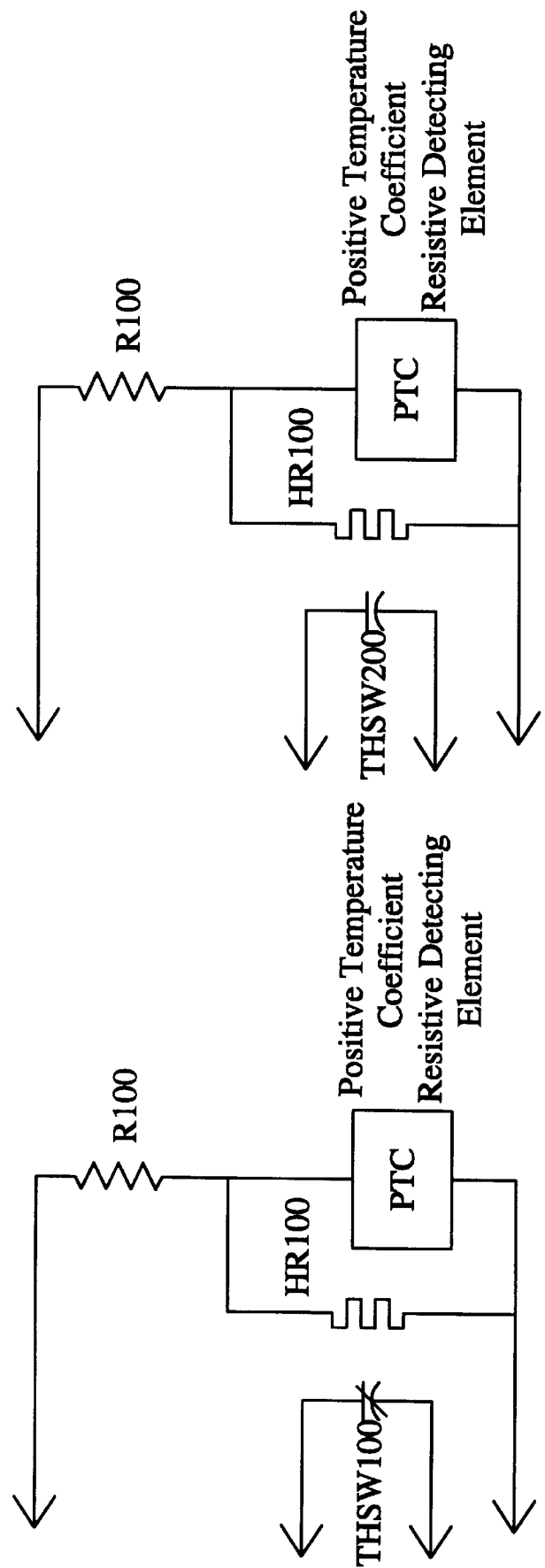

CHARGING DEVICE WHICH MONITORS CHARGING BY DETECTING A TEMPERATURE OF THE BATTERY AND WHICH INCLUDES COMPENSATION FOR INCREASES OR DECREASES IN AMBIENT TEMPERATURE

BACKGROUND OF THE INVENTION (a) Field of the Invention

A Charging Device which derives its Detecting and Monitoring functions from Temp. and featuring Environmental Temperature Differential Compensation capabilities.

(b) Description of the Prior Art

In a conventional secondary rechargeable cell, the instantaneous charging status, the saturation, in particular, may be determined by detecting the internal resistance of the terminal voltage of the secondary cell that is being charged, or else by verifying the instantaneous negative voltage effect or the temp. rise, for the same purpose, the most common method being the temp. detection approach, the pity, however, is that by and large a charging environment can be such that its ambient temp. reaches as high as 40 to 50° C., or go down below 0° C., as a result the temp. at which the battery cell is being charged would be affected accordingly.

SUMMARY OF THE INVENTION

The primary object of the invention, therefore, is to provide a Charging Device which derives its Detecting and Monitoring function from Temperature and featuring Environmental Temperature Differential Compensation capabilities, whereby a Charging Control Ckt. is simultaneously supplied with outcome of detection coming from an Ambience Temp. Detector, on the one hand, and outcome of detection coming from Detector of the Temp. of the Secondary Rechargeable Cell in a state of being charged, on the other hand, so that with a lower ambience temp. prevailing the temp. testing point respecting a charge saturation status of the secondary rechargeable cell will downgrade accordingly, while with a higher ambience temp. prevailing, the corresponding temp. testing point will mark up too commensurably, that in an effort to upgrade the precision, namely, the reliability of the result of testing of charge saturation.

BRIEF DESCRIPTION OF THE DRAWINGS

FIG. 4 is a circuit diagram of the invention whereof the Secondary Rechargeable Cell Temp. Detector in the form of an electromechanical normally closed thermo-sensitive switching elements is in parallel with a positive temp. coefficient Temp. Detector across a preheating resistor, then in series connection with a Regulatory Resistor, paralleled across the power supply; and FIG. 5 is a circuit diagram of the invention whereof the Secondary Rechargeable Cell Temp. Detector in the form of a normally open electromechanical thermo-sensitive switching elements is in parallel with a positive temp. coefficient detector across a preheating resistor, then connected in series with a regulatory resistor, paralleled across the power supply.

DETAILED DESCRIPTION OF THE PREFERRED EMBODIMENTS

Figure 1:
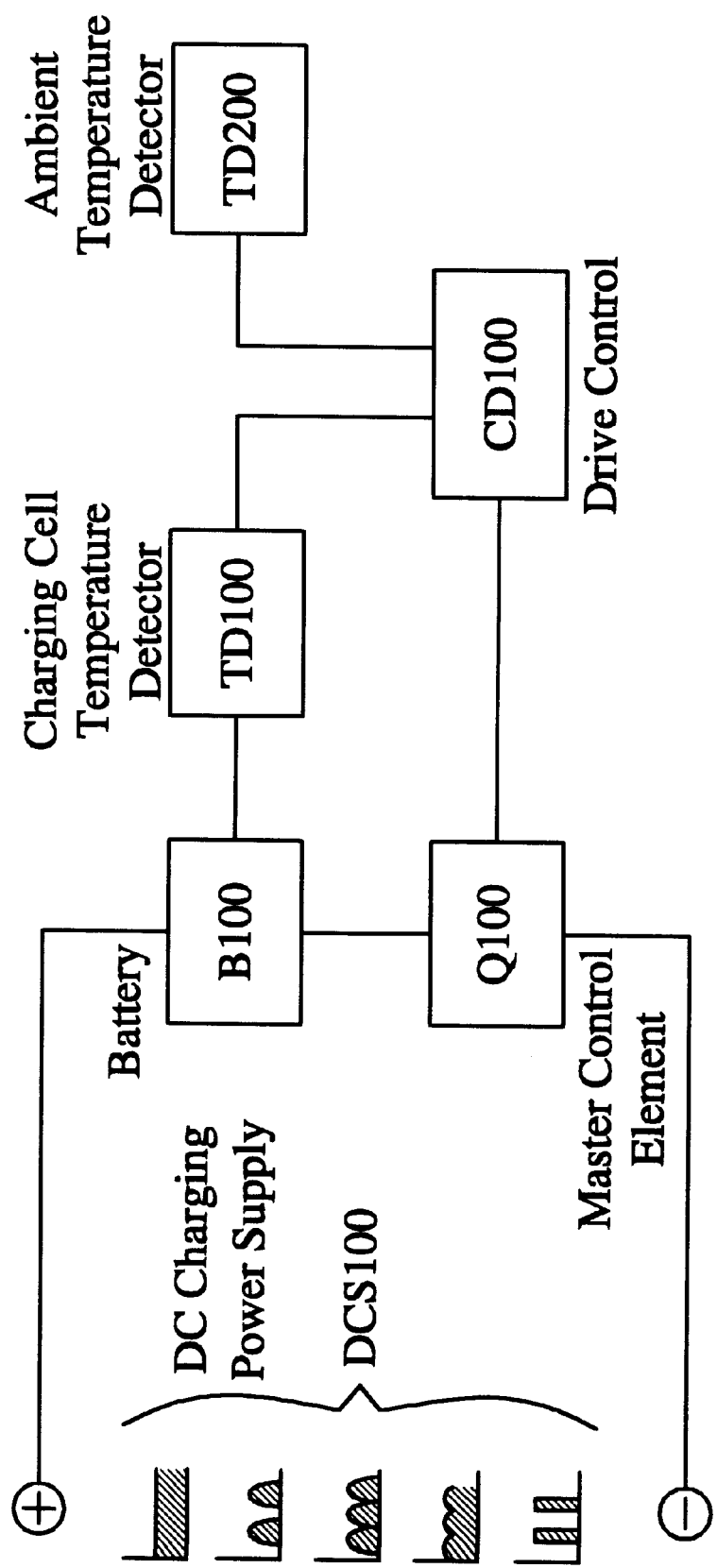
FIG. 1 is a block diagram of the circuitry embodied pursuant to the invention.

Referring first of all to FIG. 1, a circuit diagram of the invention, a charging device which derives its Detecting and Monitoring functions from Temp. and featuring Environmental Temperature Differential Compensation capabilities, the essential components include:

D.C. Charging power supply DCS100: in the form of a D.C. charging source or of a pulsating D.C. charging source;

Secondary Charging Cell B100: any chargeable/dischargeable secondary cell characterized by a change in temp. dependent upon the state of saturation;

Master Control Element Q100: composed of electromechanical element or solid state linear power rate element, in series with the secondary charging cell, wired to the D.C. Charging power supply;

Drive Control CD100: composed of electromechanical or solid state electronic elements, to process outcome of the detection performed at the Temp. Detector TD100 coupled to the Secondary Charging Cell B100 and outcome of the detection performed at Ambience Temp. Detector TD200 whereby a basis is derived to effect environmental temperature differential compensation, and for comparison with reference values, to follow that, the Master Control Element Q100 will be manipulated under set conditions to set to open or shut or still to exert linear control of current serving to charge the secondary rechargeable cells;

Secondary Rechargeable Cell Temp. Detector TD100: composed of Positive Temp. Coefficient Resistive Testing Element (PTC) or Negative Temp. Coefficient Resistive Testing Element (NTC) or alternatively of Thermo-sensitive Switching Elements, meant for direct or indirect coupling to the Secondary Rechargeable Cell B100, whereby the temp. reading of the secondary rechargeable cell is obtained with which to drive the Master Control Element Q100 by being fed to Drive Control CD100 where temp. compensation as required is prosecuted;

Environmental Temp. Detector TD200: composed either of Positive Temp. Coefficient Resistive Detecting Element (PTC) or of Negative Temp. Coefficient Resistive Element (NTC), meant to sense the environmental temperature of the charging device, with the result therefrom fed to the Drive Control CD100, to run a temp. compensation as required, which in turn serves to control the Master Control Element Q100.

A circuit constituted accordingly serves to bring down the temp. testing point respecting the charge saturation state of the secondary rechargeable cell where the environmental temp. is in a relatively lower range, but contrarily to mark up the correspondent temp. testing point in the event the environmental temp. should go up, this in an effort to enhance the reliability of the testing, and therefore determination, of a charging saturation status.

Possible combinations of afore-mentioned secondary rechargeable cell temp. detector and environmental temp. detector are exemplified below:

(1) using Negative Temp. Resistance Coefficient (NTC) elements, form a Secondary Rechargeable Cell Temp. Detector and an Environmental Temp. Detector so that once the Secondary Rechargeable Cell approaches saturation concurrent with the Cell Temp. rising to a threshold temp., the Drive Control Ckt. associated in the functioning will respond to actuate Control Means to the effect that the charging current is reduced or cutoff altogether, while on the contrary when there is a rise in environmental Temp, the threshold Temp. for the Control Means which governs the functioning of the Secondary Rechargeable will be upgraded proportionately, whereas when the Environmental Temp. goes down, the threshold temp. of the Control Means in control of the same Secondary Rechargeable Cell will be lowered commensurably.

(2) Using Positive Temp. Resistance Coefficient (PTC) Temp. Detector, form one Secondary Rechargeable Cell Temp. Detector and one Environmental Temp. Detector so that once the Secondary Rechargeable Cell approaches saturation concurrent with the Cell Temp. rising to a threshold, the Drive Control Ckt. associated in the functioning will respond to actuate Control Means to the effect that the charging current is reduced or cutoff altogether, while on the contrary when there is a rise in environmental Temp., the threshold for the Control Means which governs the functioning of the Secondary Rechargeable Cell will be upgraded proportionately, whereas when the Environmental Temp. goes down, the threshold of the Control Means in control of the same Secondary Rechargeable Cell will be lowered commensurably.

(3) Using Positive Temp. Resistance Coefficient (PTC) Detector, form a Secondary Rechargeable Cell Temp. Detector, using Negative Temp. Resistance Coefficient (NTC) Detector, as an Environmental Temp. Detector, so that once the Secondary Rechargeable Cell reaches saturation concurrent with the Cell Temp. rising to a threshold, the Drive Control ckt. associated in the functioning will respond to actuate Control Means to the effect that the charging current is reduced or cutoff altogether, while on the contrary when there is a rise in environmental temp., the threshold for the Control Means which governs the functioning of the Secondary Rechargeable Cell will be upgraded proportionately, whereas when the Environmental Temp. goes down, the threshold of the Control Means in control of the same Secondary Rechargeable Cell will be lowered commensurably.

(4) Using Negative Temp. Resistance Coefficient (NTC) elements, form a Secondary Rechargeable Cell Temp. Detector and using Positive Temp. Resistance Coefficient (PTC) Sensors, form an Environmental Temp. Detector, so that once the Secondary Rechargeable Cell approaches saturation concurrent with the Cell Temp. rising to a threshold, the Drive Control Ckt. associated in the functioning will respond to actuate Control Means to the effect that the charging current is reduced or cutoff altogether, while on the contrary when there is a rise in environment temp., the threshold for the Control Means which governs the functioning of the Secondary Rechargeable Cell will be upgraded proportionately, whereas when the Environmental Temp. goes down, the threshold of the Control Means in control of the same Secondary Rechargeable Cell will be lowered commensurably.

Figure 3:
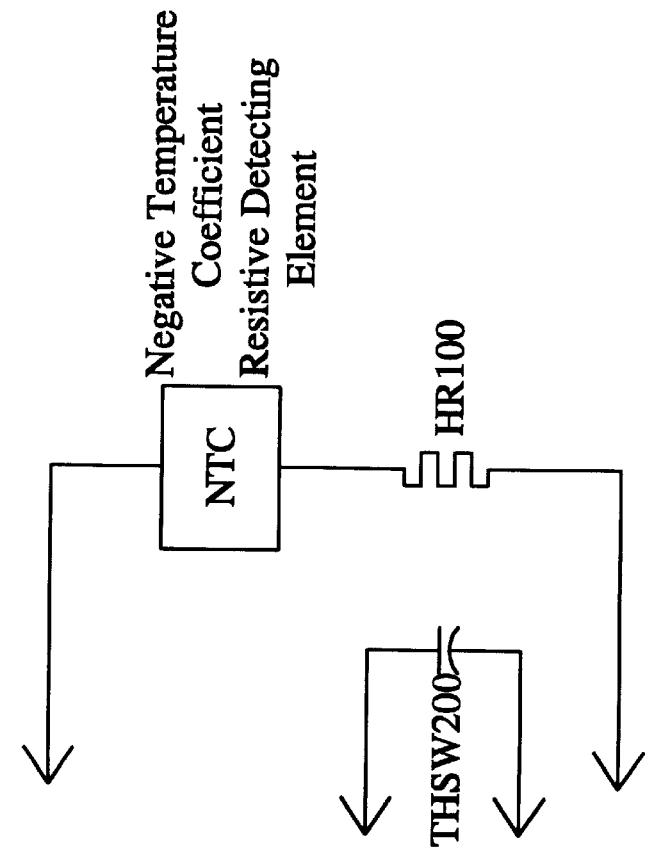
FIG. 3 is a circuit diagram of the invention whereof the Secondary Rechargeable Cell Temp. Detector in the form of a normally open thermo-sensitive switching element is in series connection with a preheating resistor and a negative temp. resistance coefficient detector, then in parallel with power supply.
Figure 2:
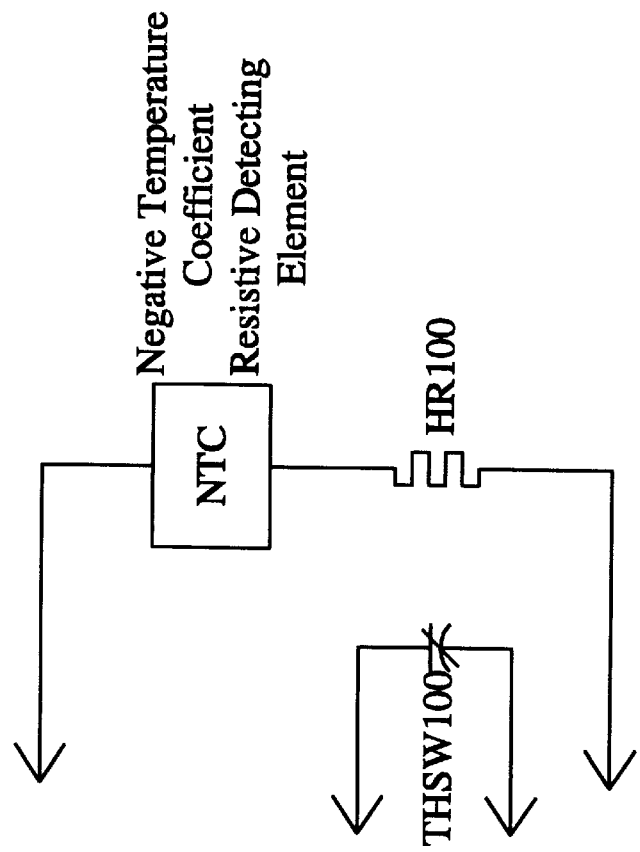
FIG. 2 is a circuit diagram of the invention whereof the Secondary Rechargeable Cell Temp. Detector in the form of an electromechanical normally closed thermo-sensitive switching elements is in series connection with a preheating resistor and a negative temp. resistance coefficient Temp. Detector, then in parallel with power supply.

An alternative approach is as illustrated in FIG. 2 whereof a Secondary Rechargeable Cell Temp. Detector is composed of an normally closed (NC) type electromechanical, thermo-sensitive switching element THSW100, in series with a preheating type resistor HR100 and a Negative Temp. Resistance Coefficient Sensor (NTC), altogether in parallel with the power supply, to the effect that heat emitted from the preheating type resistor HR100 is made inversely proportional to environmental temp., thus constituting a compensation ckt. as a function of environmental temp., or still a secondary Rechargeable Cell Temp. Detector may be composed of a normally open (NO) thermo-sensitive switching element THSW200 such as is shown in FIG. 3, whereof a series connection is made with a preheating resistor HR100 and a Negative Temp. Resistance Coefficient (NTC) Sensor, altogether in parallel with power supply, in order for heat emitted by the preheating resistor HR100 to be inversely proportional to Environmental Temp., thus constituting a compensation ckt. as a function of environmental temp., or still as exemplified in FIG. 4, a Secondary Rechargeable Cell Temp. Detector may be composed of a normally closed (NC) electromechanical type thermo-sensitive switching element THSW100, in series with a Positive Temp. Coefficient temp. sensor (PTC), a preheating resistor HR100, and a regulatory resistor R100 altogether in parallel with power supply, in order for heat emitted from the preheating resistor HR100 to be inversely proportional to environmental temp., thus constituting a compensation ckt. as a function of environmental temp., or still as exemplified in FIG. 5, a Secondary Rechargeable Cell Temp. Detector may be composed of a normally open (NO) type electromechanical, thermo-sensitive resistor HR100, in series with the parallel of a positive temp. coefficient (PTC) Sensor with a preheating resistor HR100, connected in series with a regulatory resistor R100, altogether in parallel with power supply, in order for heat produced by the preheating resistor HR100 to be inversely proportional to environmental temp., thereby constituting a compensation ckt. as a function of environmental temp.; the foregoing description deals enough with regard to the invention. A Charging Device of Detecting and Monitoring by Means of Temperature and having an Environmental Temperature Difference Compensation Function, whereof a thermo-sensitive switching element serves as a Secondary Rechargeable Cell Temp. Detector to function in coordination with an Environmental Temp. Detector composed either of a Positive Temp. Resistance Coefficient Sensor, (PTC) or of a Negative Temp. Resistance Coefficient (NTC) Sensor so that the threshold temp. of the secondary rechargeable thermo-sensitive switching element is raised in proportion to a rising environmental temp., but will revert to downgrade in response to a drop of the same environmental temp., said thermo-sensitive switching element being either of a normally closed (NC) type THSW100, or else of a normally open (NO) type THSW200, such a thermo-sensitive switching element can indirectly control electro-mechanical type or solid state a master control element or still, it may itself function as a master control switch in series with the secondary charging cell, thereby in control of the conduction or cutoff of the charging current; what follows is a description of several possible combinations of secondary charging cell temp. sensor and environmental temp. sensor employed in a charging device which derives its detecting and monitoring functions from temp. and featuring environmental temp. differential compensation capabilities according to the invention and composed of thermo-sensitive switching elements, (5) through (8);
(5) Whereof the secondary charging cell temp. sensor is composed of a normally closed (NC) type thermo-sensitive switching element THSW100; while a Negative Temp. Resistance Coefficient Sensor (NTC) constitutes the environmental temp. sensor;
(6) Whereof the secondary charging cell temp. sensor is composed of a normally open (NO) type thermo-sensitive switching element THSW100, while a Negative Temp. Resistance Coefficient (NTC) temp. sensor constitutes the environmental temp. sensor;
(7) Whereof a normally closed (NC) type thermo-sensitive switching element THSW100 constitutes a secondary charging cell temp. sensor, while a Positive Temp. Resistance Coefficient Sensor (PTC) constitutes the environmental temp. sensor;
(8) Whereof an normally open (NO) thermo-sensitive switching element THSW200 constitutes the secondary charging cell temp. sensor, while the environmental temp. sensor is composed of a Positive Temp. Resistance Coefficient Sensor (PTC).

In execution, the invention Charging Device of the Type of Detecting and Monitoring by Means of Temperature and having an Environmental Temperature Difference Compensation Feature may be arranged such that charging ckt. elements, in particular negative temp. coefficient resistive elements are assembled into the charging device, or such that elements constituting the charging ckt. and the rechargeable cell are integrated or still, such that part of the ckt. elements are mounted in the charging device while the other elements be installed in the rechargeable cell, the same are subsequently inter-connected with conductor means or junction or plug/socket set.

In summation, the invention Charging Device of the Type of Detecting and Monitoring by Means of Temperature and having an Environmental Temperature Difference Compensation Function wherein a Charging Control ckt. is simultaneously supplied with outcome of detection coming from an Ambience Temp. Detector, on the one hand, and outcome of detection coming from Detector of the Temp. of the Secondary Rechargeable Cell in a state of being charged, on the other hand, so that with a lower ambience temp. prevailing the temp. testing point respecting a charge saturation status of the secondary rechargeable cell will downgrade accordingly, while with a higher ambience temp. prevailing, the corresponding temp. testing point will make up too commensurably, that in an effort to upgrade the precision, namely, the reliability of the result of testing of charge saturation.

What is claimed is:

1. A charging device arranged to monitor a charging state of a rechargeable battery by detecting a temperature of the battery, comparing the detected battery temperature with a threshold, and determining whether the battery has reached a state of charge saturation based on a comparison of the detected battery temperature with the threshold, comprising:
   a battery temperature detector arranged to detect a temperature of the battery;
   an ambient temperature detector arranged to detect an ambient temperature; and
   a control circuit arranged to determine whether said battery has reached a state of charge saturation by comparing a temperature detected by the battery temperature detector with a threshold,
   wherein an input of said control circuit is connected to an output of said ambient temperature detector, said control circuit being arranged to adjust said threshold based on the output of said ambient temperature detector such that when said ambient temperature increases, said threshold is increased, and such that when said ambient temperature decreases, said threshold is reduced.

2. A charging device as claimed in claim 1, further comprising a master control element connected in series between the battery and a charging current source, and wherein said control circuit is arranged to at least reduce said charging current when said threshold is reached.

3. A charging device as claimed in claim 1, wherein said battery temperature detector and ambient temperature detector are negative temperature resistance coefficient elements.

4. A charging device as claimed in claim 1, wherein said battery temperature detector and ambient temperature detector both are positive temperature resistance coefficient elements.

5. A charging device as claimed in claim 1, wherein said battery temperature detector is a negative temperature resistance coefficient element and said ambient temperature detector is a positive temperature resistance coefficient element.

6. A charging device as claimed in claim 1, wherein said battery temperature detector is a positive temperature resistance coefficient element and said ambient temperature detector is a negative temperature resistance coefficient element.

7. A charging device as claimed in claim 1, wherein said battery temperature detector is a normally closed electro-mechanical thermo-sensitive switching element and said ambient temperature detector includes a preheating resistor connected in series with a negative temperature resistance coefficient sensor, and in parallel with a power source to thereby adjust said threshold by changing a switching point of said thermo-sensitive switching element in an inversely proportional manner relative to the ambient temperature.

8. A charging device as claimed in claim 1, wherein said battery temperature detector is a normally open electromechanical thermo-sensitive switching element and said ambient temperature detector includes a preheating resistor connected in series with a negative temperature resistance coefficient sensor, and in parallel with a power source to thereby adjust said threshold by changing a switching point of said thermo-sensitive switching element in an inversely proportional manner relative to the ambient temperature.

9. A charging device as claimed in claim 1, wherein said battery temperature detector is a normally closed electro-mechanical thermo-sensitive switching element and said ambient temperature detector includes a preheating resistor connected in parallel with a positive temperature resistance coefficient sensor and further in parallel with a power source to thereby adjust said threshold by changing a switching point of said thermo-sensitive switching element in an inversely proportional manner relative to the ambient temperature.

10. A charging circuit as claimed in claim 9, further comprising a regulatory resistor connected in series between said power source and said parallel-connected preheating resistor and positive temperature resistance coefficient sensor.

11. A charging device as claimed in claim 1, wherein said battery temperature detector is a normally open electromechanical thermo-sensitive switching element arranged to switch at a specific temperature and said ambient temperature detector includes a preheating resistor connected in parallel with a positive temperature resistance coefficient sensor and further in parallel with a power source to thereby adjust said threshold by changing said specific temperature at which said thermo-sensitive switching element is arranged to switch in such a manner that said specific temperature is increased when said ambient temperature decreases, and said specific temperature is decreased when said ambient temperature increases.

12. A charging device as claimed in claim 11, further comprising a regulatory resistor connected in series between said power source and said parallel-connected preheating resistor and positive temperature resistance coefficient sensor.

13. A charging device as claimed in claim 11, wherein said battery temperature detector is a thermo-sensitive switching element connected in series with the battery to thereby control a charging current supplied to said battery.

* * * * *